Dec. 25, 1951     A. E. CHURCH     2,579,796
MOTOR OPERATED CHUCK
Filed Jan. 29, 1948                           2 SHEETS—SHEET 1
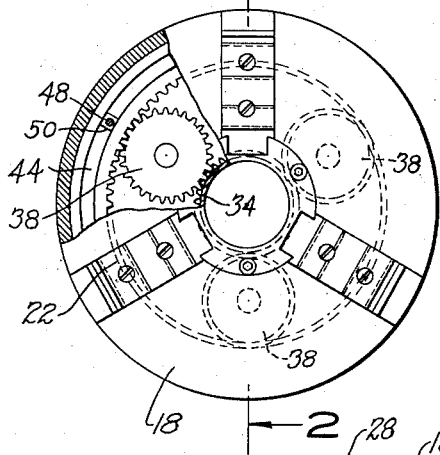
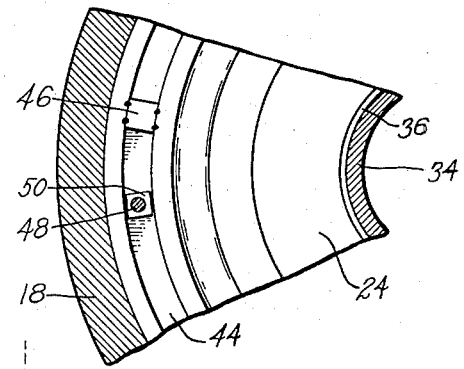
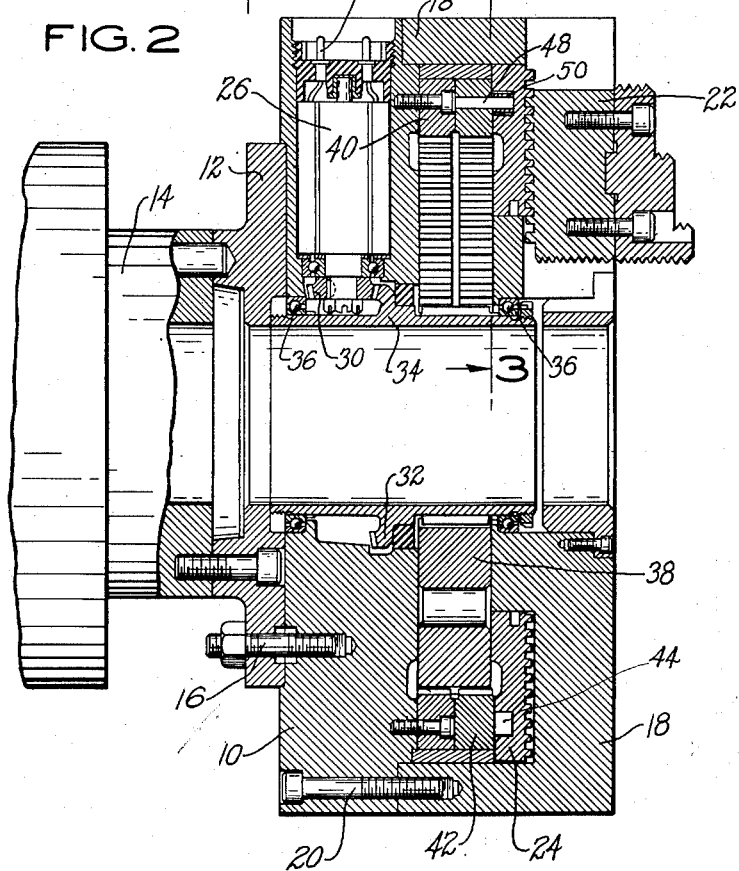
INVENTOR
A. E. CHURCH
BY Joseph K. Schofield
ATTORNEY Dec. 25, 1951  A. E. CHURCH  2,579,796
MOTOR OPERATED CHUCK
Filed Jan. 29, 1948  2 SHEETS—SHEET 2
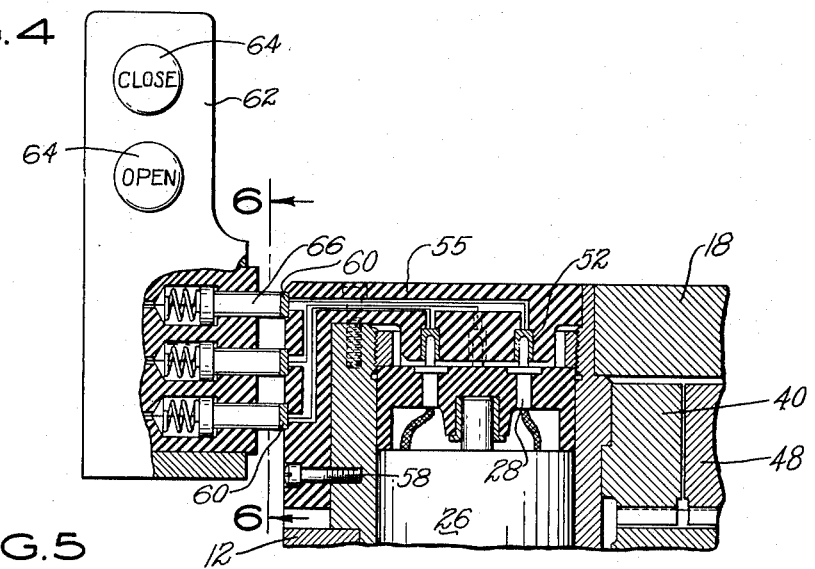
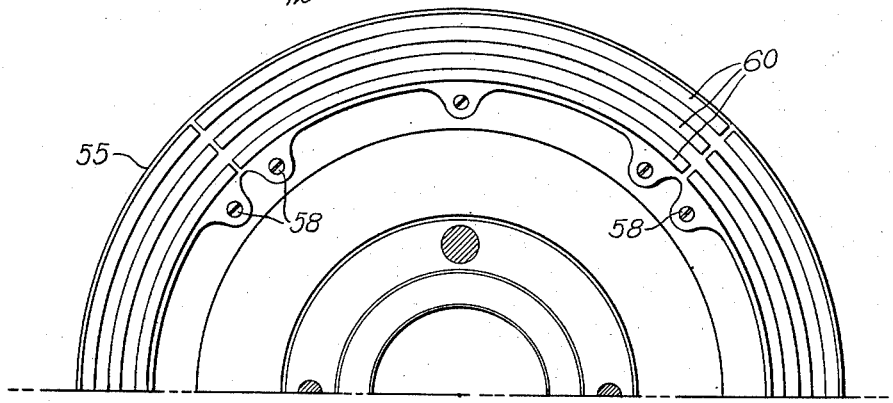
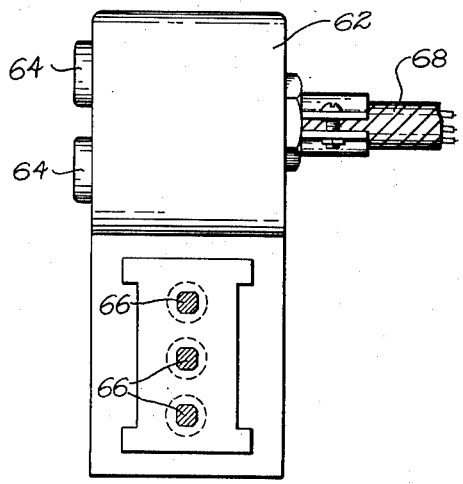
INVENTOR
A. E. CHURCH
BY Joseph H. Schofield
ATTORNEY Patented Dec. 25, 1951

2,579,796

UNITED STATES PATENT OFFICE 2,579,796

MOTOR OPERATED CHUCK

Albert E. Church, New Britain, Conn., assignor to Union Manufacturing Company, New Britain, Conn., a corporation of Connecticut Application January 29, 1948, Serial No. 4,962

2 Claims. (Cl. 279—114)

This invention relates to work holding and rotating chucks and particularly to motor operated chucks in which the motor or motors are housed within the body portion of the chuck so that they may rotate within the chuck.

An object of the invention is to provide motor operating means for radially moving the work engaging jaws of a rotatably mounted chuck that will be self-contained and may be operated by bringing electric circuit leads to and connecting said leads to terminals adjacent one or more of the motors.

A feature of the invention that is important is that one or more motors may be housed within the chuck body with the axis of each armature shaft of the motors disposed radially, there being a pinion on the inner end of each armature shaft connected to a centrally mounted jaw operating member.

Another feature that is important is that terminals for circuit leads for rotating the motor or motors in either direction are mounted in fixed position within the chuck and adjacent the periphery of the chuck body.

Another object of importance is that the jaws may be opened and closed with a hammer blow action by the power operating means for actuating the chuck jaws.

A still further object of the invention is to provide slip-rings on one face of the chuck, these slip-rings being connected by suitable leads within the chuck body to the windings for the motor, the slip-rings being connectible to retractable terminals of leads to a suitable source of current.

And finally it is an object of the invention to connect the motor or motors to a common driven member centrally mounted within the chuck and connected through appropriate gearing to the jaw operating scroll.

With the above and other objects in view the invention may include the features of construction and operation set forth in the following specification and illustrated in the accompanying drawings.

In the accompanying drawing annexed hereto and forming a part of this specification, I have shown the invention incorporated in a rotating chuck of large size but it will be understood that the invention can be otherwise embodied and that the drawing is not to be construed as defining or limiting the scope of the invention, the claims appended to this specification being relied upon for that purpose.

In the drawing:

Fig. 1 is a front elevation of a chuck made according to the present invention, parts being broken away to more clearly show its construction;

Fig. 2 is a longitudinal sectional view of the chuck shown in Fig. 1 on an enlarged scale and showing one way to energize the motor;

Fig. 3 is a fragmentary front view taken on the plane of line 3—3 in Fig. 2 showing a detail of construction;

Fig. 4 is a fragmentary longitudinal sectional view showing an alternative means for energizing the chuck operating motor or motors;

Fig. 5 is a side elevation of a chuck provided with the electrical connections shown in Fig. 4, and Fig. 6 is a side elevation of the electrical terminals shown in Fig. 4 taken on the section line 6—6 in Fig. 4.

In the above mentioned drawing, there has been shown but two embodiments or forms of the invention that are now deemed preferable, but it is to be understood that changes and modifications may be made within the scope of the appended claims without departing from the spirit of the invention.

Briefly, and in its preferred aspect, the invention may include the following principal parts: First, a chuck body mounted for rotation upon the end of a suitable spindle; second, a plurality of radially movable work engaging jaws slidably mounted in the outer face of the chuck; third, a scroll or other jaw operating member rotatably mounted centrally within the chuck body and having its operating portion in engagement with teeth on each of the rear surfaces of the jaw members; fourth, one or more motors mounted within the chuck body; fifth, a central rotatably mounted sleeve member drivingly connected to said motor or motors; sixth, driving connections between said sleeve member and the scroll member enabling a hammer blow to be struck by said connections on the scroll member, and seventh, electrical connections and terminals for supplying current to the motors.

Referring more in detail to the figures of the drawing there is provided a chuck body member 10 attached at one side to a flange or adapter plate 12 mounted on the end of a suitable spindle 14 for rotation co-axially therewith. As shown the body member 10 may be directly and rigidly attached to the adapter plate 12 by means of suitable studs or screws 16. As shown in Fig. 2 the chuck has a second or front body member 18 similar in outline to the member 10 and rigidly attached thereto as by screws 20. Within body member 18 are slidably mounted the work engaging jaws 22 which may be of conventional form and having their rear faces in engagement with teeth on a scroll member 24 to effect their opening and closing movement.

Mounted within the body member 10 are motors 26, preferably three, but one of which is shown in Fig. 2. Each of these motors 26 is provided with circuit leads, at least one motor having terminals 28 at the periphery of the chuck. One pair of terminals 28 may be provided for opening the jaws 22 and another pair for closing the jaws. Preferably each motor 26 would be of similar construction and all motors coupled electrically for simultaneous rotation in the same direction when the proper terminals 28 adjacent one of the motors are coupled with mating terminals from a source of electric current. As the motors may be of standard type and rotatable in opposite directions by application of leads to the proper terminals 28 a description of the motor circuits is not thought to be necessary.

At the inner end of the motor shaft for each motor 26 is a bevel gear pinion 30, each of these pinions being in mesh with a common central bevel gear 32 integrally formed on a sleeve member 34. This central sleeve member 34 is rotatably mounted within members 10 and 18 on suitable anti-friction bearings 36 so that it may rotate co-axially with and relatively of the chuck. On the forward portion of the sleeve member 34 are spur gear teeth meshing with three planetary gears 38 housed within body members 10 and 18. Surrounding these planetary pinions 38 and meshing with them are a pair of internal differential gears 40 and 42 having slightly different numbers of teeth. One of these differential gears 40 is attached rigidly to body member 10 as by suitable screws, and the other gear 42 is drivingly connected to the scroll member 24 in a manner presently to be described. Rotation of the motors 26 will therefore rotate the sleeve member 34, the planetary pinions 38, and by reason of the difference in tooth numbers of the gears 40 and 42 one gear will advance relative to the other gear. As the first gear 40 is fixed to the body member 10 the second gear 42 advances relative to the chuck members 10 and 18. This rotation of gear 42 relative to the chuck is used to rotate the scroll member 24 and thus radially actuate the jaw members 22.

To effect a secure tightening or closing of the chuck jaws 22 on the work and to assure positive opening of the jaws the following mechanism is employed to drivingly connect the scroll 24 to the gear 42. An annular groove 44 is provided in the inner face of the scroll 24 within which groove is secured as by spot welding or otherwise a stop member or block 46. In the front face of the gear 42 is provided a pin or stud 48 extending from the gear and entering the annular groove 44 in the scroll 24. Surrounding the extended portion of the pin 48 is a shoe 50 slidable within the groove 44. Rotation of the gear 42 in the manner above described causes the shoe 50 to strike against the side of the stop member 46 within the groove 44 in the scroll 24 thus striking this member with a blow of substantial impact. It will be understood that several stop members 46 may be provided within the scroll 24 and a corresponding number of pins or studs 48 and shoes 50 may be provided within the gear 42. In this manner a complete rotation of the gear 42 within the chuck members will not be required to start rotation of the scroll.

From the above description it is thought that the operation of the chuck will be obvious. To tighten the jaws 22 it is only necessary to bring over line leads in the form of a flexible cable or extension cord to the appropriate terminals 28. The cable at its free end would be provided with a terminal member having sockets for each lead which will fit over the pair of terminals 28 to rotate the motor or motors in a direction to effect the desired movement of the jaws 22.

In Figs. 4, 5 and 6 is shown an alternative means for energizing the motors 26. This means includes an addition to the construction shown in Figs. 1, 2 and 3. Enclosing the terminals 28 of the chuck 18 shown in Fig. 4, three of these being shown, is an annular member 55 made up in three or more sections for mounting in fixed position on the periphery and one face of the chuck. It will be understood that sockets 52 within sectional member 55 will be provided for each terminal 28. This member 55 will preferably be made of insulating material within which the sockets 52 and their leads will be embedded. To secure the sections of member 55 in fixed position screws 58 may be provided. On the side face of member 55 are secured slip rings 60, each of these rings being connected by a suitable lead to one of the terminals 28 for each motor 26. The rings 60 and the member 55 will therefore rotate with the chuck 18 as a fixed part thereof. To energize these rings 60 to rotate the motors 26 in opposite directions the following means may be provided.

Fixed in position adjacent the side face of the chuck 18 on which are mounted the slip rings 60 is a switch body 62 having a pair of push buttons 64, these buttons when depressed connecting terminals 66 within the switch body 62 with the slip rings 60. Terminals 66 as shown are spring pressed in a direction to engage the rings 60. Also the switch body 62 is connected by a cable 68 leading to a supply of current. The mounting for the switch body 62 is not shown but it will be understood that it will be independent of the chuck and maintained in fixed position closely adjacent the side face of the chuck. Also if desired the terminals 66 within the switch body may be retractible so that when neither button 64 is depressed these terminals will be out of contact with their slip rings 60.

I claim as my invention:

1. A chuck comprising a body member having work engaging jaws radially moveable therein, a scroll within the chuck rotation of which actuates said jaws into and out of work engaging position, a motor housed within said body member and having its armature shaft drivingly connected to a central rotatable gear member within said body member, planet gears meshing with said central gear, a pair of differential gears driven by said central member and planet gears whereby said gears are rotated at slightly different speed, one of said gears being attached to said body member and the other gear connected to said scroll, whereby rotation of said motor will rotate said scroll, and circuit terminals for said motor at the periphery of said body member.

2. A chuck comprising a body member having work engaging jaws radially moveable therein, a scroll within the chuck rotation of which actuates said jaws into and out of work engaging position, a motor housed within said body member and having its armature shaft drivingly connected to a rotatable member, said member being mounted co-axially within said body member and having gear teeth on its periphery, planet gears meshing with said rotatable members, a pair of differential gears driven by said central member and planet gears whereby said gears are rotated at slightly different speed, one of said differential gears being attached to said body member and the other gear connected to said scroll with a lost motion connection whereby rotation of said motor will rotate said scroll and said second differential gear will strike said scroll with an impact blow, and circuit terminals for said motor at the periphery of said body member.

ALBERT E. CHURCH.

REFERENCES CITED

The following references are of record in the file of this patent:

UNITED STATES PATENTS

| Number | Name | Date |
|---|---|---|
| 1,534,572 | Cutler | Apr. 21, 1925 |
| 1,548,949 | Horton | Aug. 11, 1925 |
| 1,699,359 | Hay | Jan. 15, 1929 |
| 2,358,049 | Bogart | Sept. 12, 1944 |
| 2,399,622 | Bogart | May 7, 1946 |